INVENTORS
ISRAEL S. UNGAR &
HERBERT I. SCHER

BY Karl W. Flocks

ATTORNEY

United States Patent Office 3,761,338
Patented Sept. 25, 1973

3,761,338
TEXTURIZING FILM FOR THE MANUFACTURE OF HIGH PRESSURE LAMINATES
Israel S. Ungar and Herbert I. Scher, Randallstown, Md., assignors to Esso Research and Engineering Company
Filed Sept. 8, 1971, Ser. No. 178,609
Int. Cl. B44c 1/24
U.S. Cl. 156—219                                   2 Claims

ABSTRACT OF THE DISCLOSURE

A high pressure laminate having a textured and/or embossed surface is produced using as the embossing layer a thermoplastic film having a negative reproduction of the texture and/or embossing to be produced on the high pressure laminate. Such thermoplastic film is thin, inexpensive and is discarded after a single usage. The thermoplastic material has a heat deflection point below that at which the high pressure lamination is carried out.

FIELD OF INVENTION

The present invention relates to decorative high pressure laminates and, more particularly, to a textured and/or embossed thermoplastic film used in the high pressure laminating operation, which film imparts a textured and/or embossed or sculptured three-dimensional effect to the laminate produced.

BACKGROUND OF THE INVENTION

The production of high pressure laminates is well known and has been carried out for many years. Generally such laminates are produced by consolidating, under heated pressure, plys of paper impregnated with thermosetting condensation resins. The plys are typically consolidated and cured at 500–1600 p.s.i., preferably 800–1200 p.s.i., and at a temperature of 230–310° F., preferably 260–310° F., against suitable pressure plate dies, usually steel caul plates, which provide the laminate with a smooth surface. The laminates produced are durable, extremely hard and attractive and provide a permanent surfacing material known as a "high pressure laminate"; these have, for many years, found use as table tops, desk tops, counter tops, wall paneling, etc.

Most general purpose decorative high pressure laminates, of about 1/16" thickness, comprise a top ply of alpha-cellulose paper, about 29 pounds ream weight, impregnated with a partially cured water solution of melamine-formaldehyde condensate; a print ply therebeneath, normally an alpha-cellulose paper, pigment filled, with or without decorating printing, ranging in weight from 65 to 125 lbs. ream weight and also impregnated with a partially cured amino resin condensate, usually the same melamine-formaldehyde resin as used in the overlay ply; and therebeneath a plurality, such as six, core plys which are normally 100–130 lb. ream weight kraft paper, impregnated with a water or alcohol soluble partially cured phenol-formaldehyde condensate. All of such partially cured resin condensates are referred to as being in the "B-stage"; in this stage they are thermoplastic and will flow under heat and pressure during the high heat, high pressure laminating procedure.

In the early years of the production of high pressure laminates, generally only glossy surface laminates were produced by pressing the resin impregnated sheets between polished die plates under the high pressure and temperature conditions necessary, although some attempts were made to provide laminates with some slight surface irregularity to give or satin or textured finishes, using roughened die plates, or through after treatments of the laminate. In more recent years, it has become increasingly desirable to provide various types of irregular decorative surfaces, and these range from surfaces having relatively shallow depressions, such as matte or "textured" surfaces, to relatively deeply sculptured or embossed surfaces which have a noticeable 3-dimensional effect, such as wood grain, leather, slate, etc. With the rising cost of such natural materials, it has become even more desirable to provide irregularly surfaced high pressure laminates which simulate these materials.

Thus, high pressure decorative laminates are now manufactured with smooth surfaces, with finely "textured" surfaces and with deeply sculptured or embossed surfaces, these latter surfaces normally having a "textured" superimposed over the deeply sculptured effect. Today, "textured" surfaces, including shallow matte surfaces, are normally produced in the same manner as the glossy surface laminates as indicated above, except that a texture imparting separating sheet is included between the upper laminate surface and the smooth steel plate. These separating or parting sheets, normally used but once and then thrown away, have small density variations across their surfaces. During the laminating procedure, the areas of lower density are compressed which causes an irregular surface thickness in such parting sheet, which irregularity is transferred to the laminate surface as the resin flows and cures under heat and pressure.

Conventionally, the parting sheet used to produce a "textured" laminate is kraft paper bonded to aluminum foil having a thickness of about 0.3 mil, the aluminum foil being provided to permit release of the parting sheet from the cured laminate surface. Other texture imparting separator sheets are also used including various papers coated and/or impregnated with various resins and plastics such as fluocarbon resins, silicone oils or resins, sodium alginate coated paper, "Quilon" coated paper, etc. For example, to provide a matte surface, there is normally used a 25 lb. paper with an organic release coating as the parting sheet. Such types of separator sheets have found great usage in the art since they are reliable and produce highly acceptable products. In general, however, the depth of variation by the use of such separator sheets is no more than about 1 mil and in many cases the cost of such throwaway parting sheets is higher than desirable.

Where it has been desired to provide deeply embossed or sculptured surfaces having surface depth variation of 1 to 7 mils that duplicate natural products such as slate, leather, wood and the like, or man-made designs such as fabric texture or abstract designs, it has generally been necessary to use either extremely expensive machined or etched steel plates or, alternatively, thermoset pressing plate dies of the types described in the Jenkins Pat. No. 2,606,855 or the Michaelson et al. Pat. No. 3,303,081 or 3,311,520. More recently, there has been developed the use of simple, effective and inexpensive separators of the type disclosed in our copending application Ser. No. 865,894, filed Oct. 13, 1969, now Pat. No. 3,674,614, briefly these embossing separator sheets comprise a nonstick facing and an absorbent carrier backing impregnated with a substantial quantity of a salt having a melting point slightly above the temperature of lamination, so that such sheets can be deeply embossed at a temperature above the fusion temperature of the impregnant salt which will then freeze and not remelt during the high pressure laminating operation.

The difficulty with the use of thermoset molding plates of the Jenkins and Michaelson et al. types involves the process of their formation, i.e. they must be cured or thermoset while being pressed and this requires not only an extended forming operation, but also relatively critical curing conditions which, for practical purposes, make a continuous embossing operation very time consuming and expensive. In addition, a release facing or a parting sheet is required. The separator sheets of our copending application 865,894, on the other hand, provide a satisfactory, inexpensive answer to the problem; nevertheless, in many cases the cost of such separator sheets may be higher than desired because of the necessity of the utilization of a release facing.

Molding elements have also been formed of thermoplastic materials, but such thermoplastic materials have been very expensive and have been essentially a substitute for metal. Thus, the Wheeler Pat. No. 3,380,878 shows a thermoplastic matrix against which materials may be molded, the thermoplastic matrix having thermal and dimensional stability for molding temperatures of up to 350° F. The thermoplastic matrix is formed of a relatively expensive polyaryline polyether which is particularly designed not to distort during its usage. The Wheeler material thus acts as a permanent matrix, which might as well be metal.

It has also been recently proposed, noting the Hale et al. Pat. No. 3,454,457, that a caul plate of the type disclosed in the Jenkins Pat. No. 2,606,855 be modified by replacement of the exterior ply of aluminum foil with a synthetic resin film of polyvinyl fluoride, polytetrafluoryl ethalene or biaxially-oriented polypropylene, the film shrinking tightly over the caul plate base during usage. The system so suggested by Hale et al. suffers from the basic economic disadvantages of the Jenkins patent, discussed above, i.e. the cost of curing the laminated plate, besides the expense of providing the polymeric release surface. In addition, to insure suitable bonding of the release layer to the laminate, such release layer must be specially treated. The film, which becomes a part of the press plate as in Jenkins, is of uniform thickness.

Post embossing the cured laminate has also been proposed, but this procedure has the serious defect of preventing any further heat-shaping operations. Accordingly, the most satisfactory methods for producing deeply embossed or sculptured laminates, up to the time of the invention of our copending application Ser. No. 865,894, have required the use of expensive embossed metal molding plates or those described in the Michaelson et al. patents. While the expedients taught by the Michaelson et al. patents have proved a great advance in the art, there are many instances where it is preferable to use a cheaper and thinner separator such as is used in the formation of shallow "textured" laminates.

SUMMARY OF THE INVENTION

It is, accordingly, an object of the present invention to overcome the deficiencies of the prior art, such as indicated above.

It is another object of the present invention to provide for the inexpensive production of textured and/or embossed high pressure laminates.

It is another object of the present invention to provide sculptured or embossed and/or textured separator film for use in the manufacture of high-pressure decorative laminates, and which will impart a texture and/or relatively deep embossment to a laminate in spite of the fact that the film is fusible at a temperature below the high temperature and pressure conditions of the high pressure laminating procedure.

It is another object of the present invention to provide a deeply embossed and/or textured parting sheet which is sufficiently inexpensive so that it can be thrown away after one usage.

It is another object of the present invention to provide a method for making sculptured and/or textured separator films for use in the manufacture of high pressure laminates.

It is another object of the present invention to provide a single ply texturizing film for use in the manufacture of high pressure laminates, which film is not only highly effective, but is even less expensive than the conventionally used parting sheets, such as kraft paper-aluminum foil, silicone treated paper, "Quilon" treated paper, etc.

These and other objects and certain advantages of the instant invention will be more apparent from the following discussion. Contrary to the prior art, in accordance with the present invention there is used as a simple, one ply texture imparting separator, a relatively low temperature melting, inexpensive thermoplastic film which has been given a texture or embossing by simply running through a pair of heated rollers, one of which has a surface corresponding to the desired texture or embossing. It is highly surprising that although the thermoplastic film, preferably polypropylene of melt index up to 10, softens at the temperature and pressure used in the high pressure laminating procedure, it nevertheless is able to sufficiently retain its embossing or texture, previously given to it, sufficiently long so as to transfer such embossing or texture to the laminate under consolidation. In this regard it is theorized, although the invention is not to be limited to such theory, that the melamine resin in the laminate flows and gels before the polypropylene film reaches distortion conditions.

The invention will be better understood by the following detailed description of an embodiment which will so reveal the general nature of the invention that others can, by applying current knowledge, readily modify and/ or adapt such embodiment for various applications without departing from the generic concept, and therefore such adaptations in modifications should and are intended to be comprehended within the meaning and range of equivalence of the present invention.

DESCRIPTION OF PREFERRED EMBODIMENT

Briefly, the invention uses as a partion or separating sheet a thin film of common thermoplastic material. Such thermoplastic material is preferably inexpensive polypropylene film having a melt index below 10. In actual tests polypropylene film with melt indices of 3 and 0.8 have worked well. On the other hand, a polypropylene film having a melt index of 15 did not work. If desired, certain other more expensive materials may be used, but these are not preferred; among such materials may be mentioned cross-linked polyethylene film which has first been provided with the desired texture and has then been crosslinked.

The thickness of the polypropylene film in the present invention is not critical, except to the extent that the total film thickness must be at least as great as the thickness of the texture or embossing desired to be imparted. Thus, polypropylene films of thickness no greater than 1 mil can normally be used only for imparting a fine texture, not for deep embossments. On the other hand, any of the conventional film thickness of 100 mils or less may be used in the present invention, it being understood that for the provision of deep embossments it will normally be desirable to use a film having a thickness of greater than 5 mils.

Figure 1:
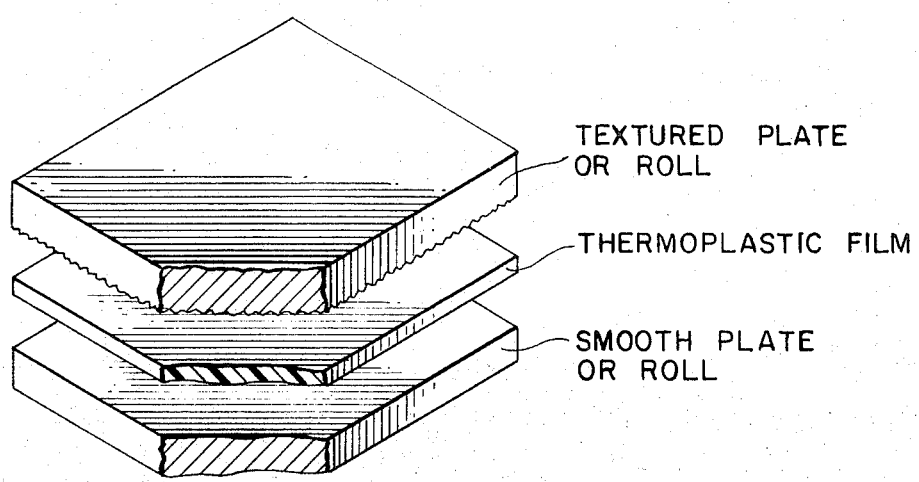
FIG. 1 is a schematic perspective view showing embossing of the film.

Referring to FIG. 1, there is shown, schematically, a technique for imparting the desired texture or embossing to the thermoplastic film intended to be used as the texture imparting separator sheet in the later high pressure laminating operation. Very simply, the thermoplastic film may be squeezed between pressure plates, one of which is smooth and the other of which carries the desired texture or embossing. Sufficient heat is imparted to cause the thermoplastic film to flow into the valleys and around the peaks of the textured plate. The resultant embossed thermoplastic film shown in FIG. 2 in usage, is thereby provided with one flat surface and one surface which is a negative reproduction of both the textured plate used to form it and the high pressure laminate to be produced by it; as is quite clear, such embossed thermoplastic film has a nonuniform thickness.

In lieu of using a textured plate and smooth plate between which the thermoplastic film is pressed, such an operation may be carried out continuously by passing the thermoplastic film between the nip of a pair of rolls, one of which is smooth and the other of which has the desired texture or embossing. Those rolls may both be heated, or only the embossed or textured roll may be heated; as an alternative, the thermoplastic film may be preheated and the roll(s) may be cooled. The amount of pressure needed to emboss the thermoplastic film is not great and may be easily determined depending on the thickness of the film, the melt index of the polypropylene film, and the amount of heat applied.

Figure 2:
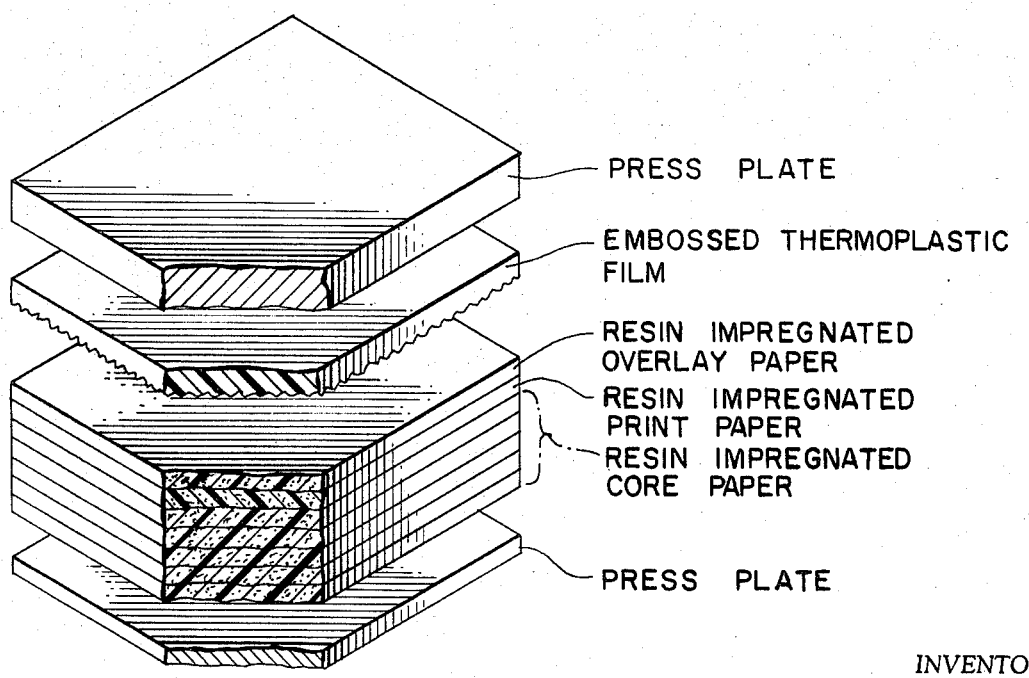
FIG. 2 is a schematic, perspective view showing use of the embossed film in the manufacture of a textured or embossed high pressure laminate.

After embossing of the film it is then used in a normal assembly, such as that shown in FIG. 2, in place of the conventional parting sheets of the prior art. Thus there is shown in FIG. 2 a laminate assembly comprising phenolci impregnated core sheets, over which there is provided a melamine resins impregnated print sheet and having as a top ply a melamine resin impregnated overlay sheet. Above this assembly, and in facing contact with the overlay sheet, is provided—with its negative textured or embossed configuration facing downwardly—the embossed thermoplastic film. The resulting assembly is then pressed between flat caul plates in accordance with normal practice and at normal temperatures and pressures as delineated above, i.e. preferably 260–310° F. and 800–1200 p.s.i.

After completion of the curing cycle, the resultant laminate, fully consolidated and cured to the desired degree, is removed and the polypropylene film is stripped from its upper surface and discarded.

It is highly surprising that the polypropylene film will impart its embossing or texture to the laminate in spite of the fact that the laminating operation is carried out at a temperature which is above the heat distortion of the polypropylene film. In fact, the polypropylene film may be given its texture or embossing at precisely the same temperature and pressure used to produce the laminate in the laminating operation. Contrary to what would be expected, i.e. that the laminating operation would cause flattening to a uniform thickness of the polypropylene film at the high pressure laminating temperature and pressure, it surprisingly turns out that for some unknown reason the peaks and valleys on the embossed thermoplastic film retain their form sufficiently long to provide the complementary form to the laminate being produced.

For a better understanding of the invention, a specific working example is given below, it being understood that this example is intended to be merely exemplary, and in no way limitative.

A sheet of polypropylene film of 1.0 mil thickness and having a melt index of 8 was textured between an embossed plate and a smooth plate at a temperature of 280° F. and a pressure of 1000 p.s.i. as shown in FIG. 1. This film was then placed between a smooth steel press plate and a laminate make-up as shown in FIG. 2. After pressing at 1000 p.s.i. and 280° F. for thirty minutes the resultant laminate had a reverse texture to the embossed film. The film was peeled off and discarded. The laminate was fully satisfactory.

The process was repeated using a polypropylene film of 1.5 mils thickness and melt index 0.3. Exactly the same results occurred.

On the other hand, when attempting to use a polypropylene film of melt index 15, it was possible to provide a suitable texture in the polypropylene film, but during the laminating operation the film flattened and did not impart its texture to the laminate.

It is to be understood that the invention is not limited to the embodiments disclosed above which are illustratively offered, and that modifications may be made without departing from the scope of the invention. Also those having normal skill in the art may select other suitable thermoplastic materials which may be substituted for the polypropylene film described above.

In the following claims it will be understood that the term "texture" is intended to include not only shallow textures, but also relatively deep embossing and, vice versa, the term "embossing" is intended to encompass not only the provision of deep sculptured effects, but also shallow textures.

What is claimed is:

1. A method for the manufacture of textured high pressure laminates comprising:

providing an embossed polypropylene film of non-uniform thickness and a melt index no greater than about 10, said film having a flat back and a negative of the texture desired to be imparted to said laminate on its face thereof, said film having been embossed at a temperature of about 260–310° F. and about 800–1200 p.s.i.;

assembling in a stack, from the bottom upwardly, a relatively flat backing die, a plurality of phenolic resin impregnated core sheets, an amino resin impregnated print sheet, an amino resin impregnated overlay sheet, said textured polypropylene film with the texture facing said overlay sheet, and a relatively flat fronting die;

squeezing said assembly under about 800–1200 p.s.i. at a temperature between about 260 and 310° F. for a time sufficient to effect lamination and cure of said resin impregnated sheet to a unitary structure; and stripping said dies and said polypropylene film from the resultant laminate.

2. A method in accordance with claim 1 wherein said polypropylene film is textured by its passage through the nip of a pair of rotating rolls, one said roll having a textured surface and the other being smooth.

References Cited

UNITED STATES PATENTS

| | | | |
|---|---|---|---|
| 3,373,068 | 3/1968 | Grosheim et al. | 156—289 |
| 3,454,457 | 7/1969 | Hale et al. | 161—189 |
| 3,484,835 | 12/1969 | Trounstine et al. | 264—284 |
| 3,507,733 | 4/1970 | Davidson | 264—338 |

OTHER REFERENCES

Theodore O. J. Kresser: Polypropylene, Reinhold Publishing Co., 1960, p. 51, Library of Congress, 60–53435.

GEORGE F. LESMES, Primary Examiner

S. S. SILVERMAN, Assistant Examiner

U.S. Cl. X.R.

156—209, 220, 247, 323; 161—119, 120, 121, 400, Dig. 3; 264—220, 284, 293